United States Patent Office 3,498,979
Patented Mar. 3, 1970

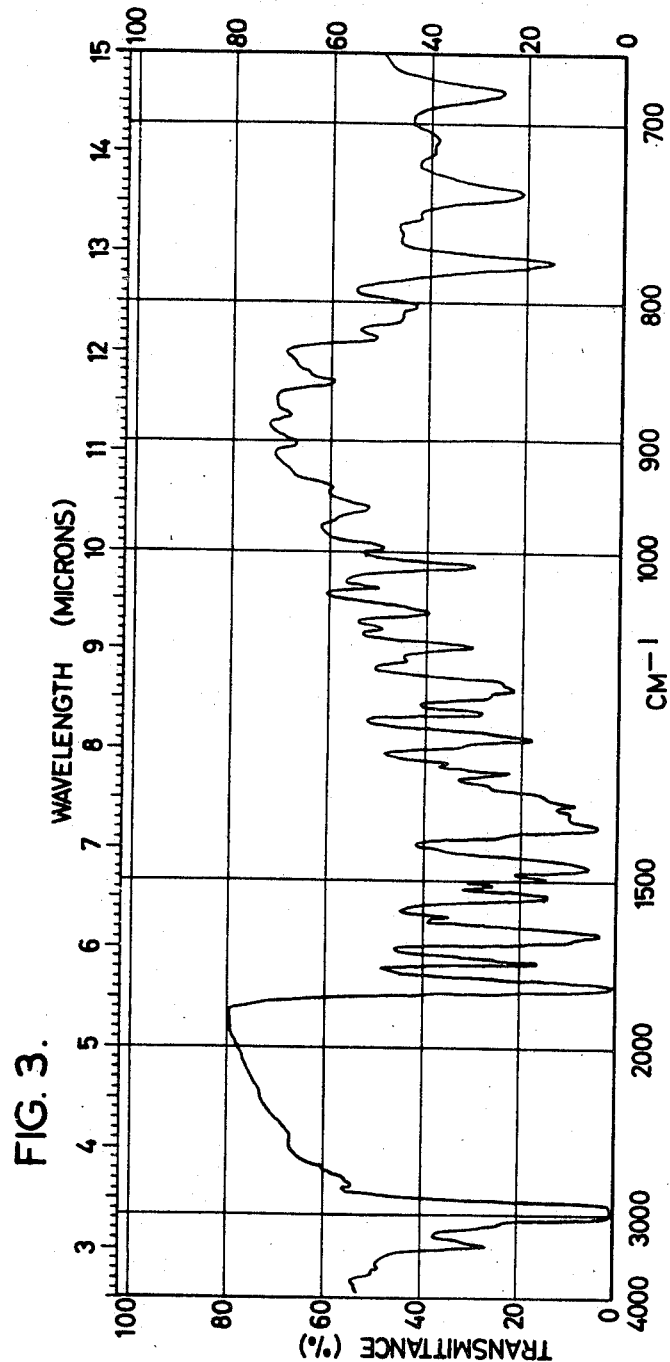

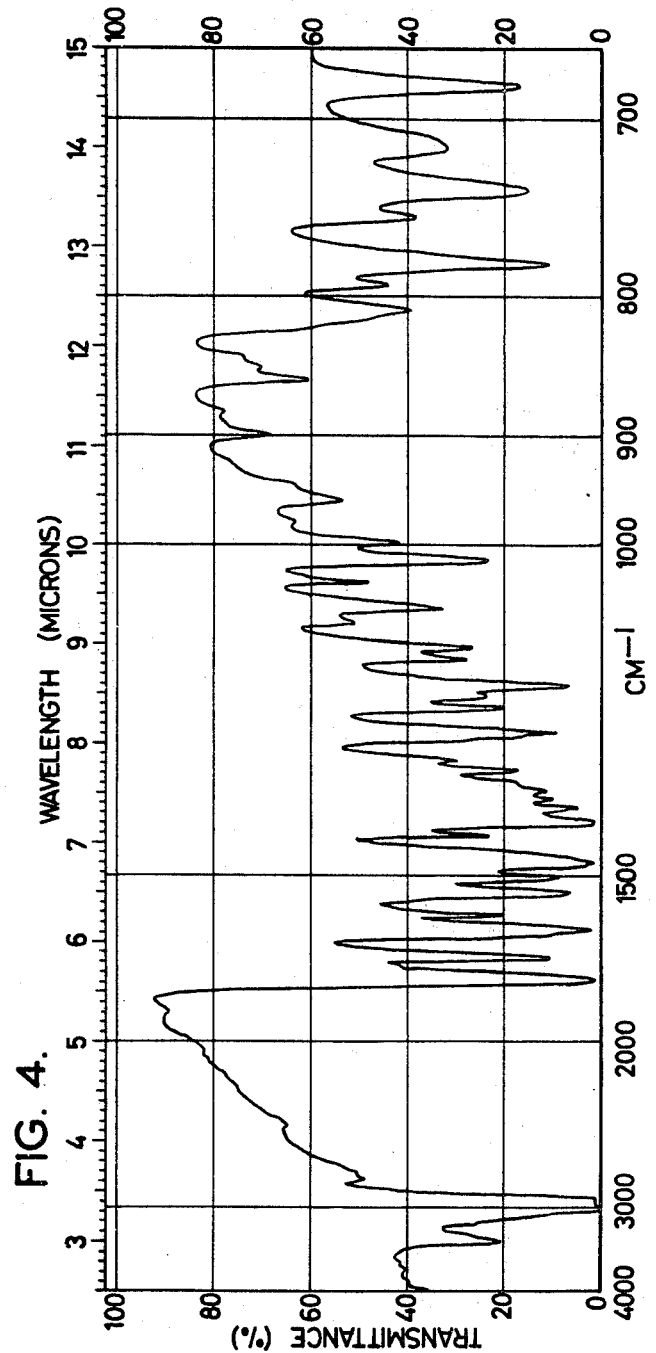

3,498,979
RECOVERY OF N-(7-2'-THIENYLACETAMIDO-CEPH-3-EM-3-YLMETHYL) PYRIDINIUM - 4-CARBOXYLATE FROM AN ACID ADDITION SALT THEREOF
Harold A. Crisp, Harrow Weald, John Francis Oughton, Gerrards Cross, Christopher John Sharp, Northolt, and Peter Alfred Wilkinson, South Croydon, England, assignors to Glaxo Laboratories Limited, Greenford, Middlesex, England, a British company
Continuation-in-part of application Ser. No. 605,474, Dec. 28, 1966. This application Apr. 3, 1967, Ser. No. 627,933
Int. Cl. C07d 99/24
U.S. Cl. 260—243
18 Claims

ABSTRACT OF THE DISCLOSURE

The betaine, N-(7-2'-thienylacetamidoceph - 3 - em-3-ylmethyl) pyridinium - 4-carboxylate, a broad spectrum antibiotic, is regenerated and recovered from an acid addition salt thereof with an acid having a pKa of not greater than 4 by contacting an organic solution of the salt with an organic base to form an organic solution of an acid addition salt of the base and recovering the betaine from the organic medium. Depending on the organic solvent selected, there may be obtained particular crystalline forms of the betaine which are relatively non-hygroscopic compared with the hydrogscopic forms previously prepared.

---

Figure 1:
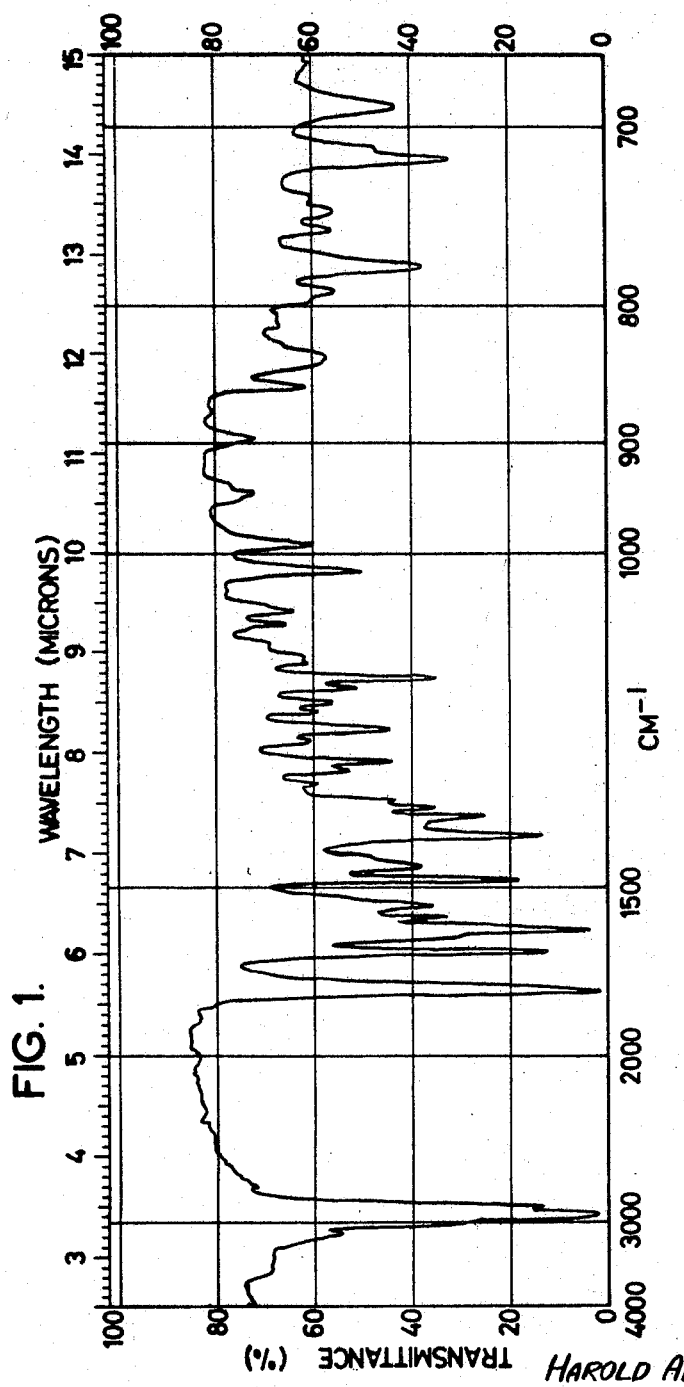

This application is a continuation-in-part of our copending application Ser. No. 605,474, filed Dec. 28, 1966, now abandoned which latter application is in turn a continuation-in-part of our copending application Ser. No. 408,919, filed Nov. 4, 1964 and also abandoned. It is concerned with the production of antibiotics derived from cephalosporin C.

British patent specifications Nos. 912,541 and 966,221 describe and claim cephaolsporin $C_A$ compounds and their preparation by the condensation of a 7-acylamidocephalosporanic acid with pyridine or like tertiary organic base in a polar medium, e.g., water. A cephalosporin $C_A$ compound of great importance as a broad-spectrum antibiotic is cephaloridine, viz N-(7-2'-thienylacetamidoceph-3-em-3-ylmethyl) pyridinium-4-carboxylate, which forms the subject of British Patent No. 1,028,563 of the persent assignees, Glaxo Laboratories Limited.

The production of acid addition salts containing cations of the general formula:

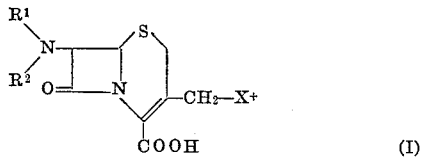

(I)

wherein $R^1$ is a hydrogen atom and $R^2$ is an acyl group and X is a quaternary amino group is described in U.S. Patent No. 3,280,118 of Eardley et al. issued Oct. 18, 1966. The anion of the salt is preferably derived from an acid having a pKa of 4 or less. These salts are useful, inter alia, in the purification of the parent betaine, viz:

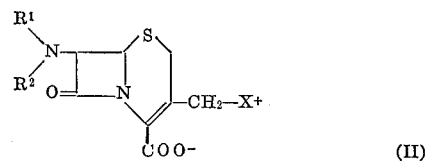

(II)

wherein $R^1$, $R^2$ and X have the meanings defined above. As is described in U.S. Patent No. 3,280,118 the betaine can be regenerated from the acid addition salt by slurrying the latter in water with an anion exchange resin in a weak acid form, e.g., the acetate form. The resulting salt is unstable and loses the acid ion on processing to yield the betaine.

However, we have now devised an improved process for the recovery of said betaine from acid additions salts. Essentially our invention resides in the recognition of the fact that said acid addition salts have in general different solubility characteristics in organic media to said betaines. By virtue of this we can dissolve the salt in an organic solvent, convert the salt to the betaine in situ, and recover the betaine from the reaction mixture. Although the yield of the betaine may not be any higher than from other methods, the colour and hence the purity of the betaine is in general improved if it is obtained by the process according to the invention. Moreover, the process is relatively simple and inexpensive.

According to the invention, therefore, there is provided a process for the recovery of betaines of general Formula II from acid addition salts containing cations of general Formula I which comprises effecting reaction in solution in an organic solvent between said acid addition salt and a base, preferably a strong organic base, to form a soluble acid addition salt of said base and recovering said betaine from the reaction mixture.

By the expression "strong organic base" as used herein we mean a base having a pKb of less than 6.

The salts used in the process according to the invention are as defined in said U.S. Patent No. 3,280,118 and are preferably derived from an acid having a pKa of 4 oz. less. We particularly prefer to use the hydronitrate salt as it forms a well-defined crystalline material enabling one to regenerate the betaine therefrom in a high state of purity.

Whilst $R^1$ may represent an acyl group in general terms, specific acyl groups which may be used include those having the general formulae:

(i) R' $(CH_2)_nCO$—where R' is aryl, cycloalkyl, substituted aryl, substituted cycloalkyl or heterocyclic group and $n$ is an integer from 1–8, preferably 1–4. The heterocyclic ring is preferably a 5- or 6-membered ring containing one or more of O, S and N or such a ring fused to benzene. Examples of these group include phenylacetyl, nitrophenylacetyl, phenylpropionyl, cyclohexylacetyl and thienylacetyl.

(ii) $C_nH_{2n+1}CO$—where $n$ is 0 or an integer from 1–7. The alkyl group may be straight or branched and, if desired, may be interrupted by an oxygen or a sulphur atom. Examples of such groups include formyl, acetyl, hexanoyl, heptanoyl, octanoyl and butylthioacetyl.

(iii) $C_nH_{2n-1}CO$—where $n$ is an integer from 2–7. The alkenyl group may be straight or branched and, if desired, may be interrupted by an oxygen or a sulphur atom. Examples of such groups include acrlyl and alkylthioacetyl.

(iv) R'O CR"R'''.CO—where R' has the meaning defined under (i) or is an alkyl group and R" and R''' are the same or are different and each is a hydrogen atom or an alkyl group. An example of such a group is phenoxyacetyl.

(v) R'SCR"R'''.CO—where R',R" and R''' are as defined under (iv). Examples of such thio groups include S-phenylthioacetyl, S-chlorophenylthioacetyl and S-bromophenylthioacetyl.

(vi) R'(CH$_2$)$_m$S(CH$_2$)$_n$CR"R'''.CO—where R', R" and R''' are as defined under (iv), $m$ is an integer from 1–4 and $n$ is 0 or an integer from 1–4. Examples of such a group include S-benzylthioacetyl, benzylthiopropionyl and β-phenethylthioacetyl.

(vii) R'CO—where R' has the meaning defined under (i). Examples of such groups include benzoyl, substituted benzoyl and cyclopentanoyl. Where the benzoyl group is substituted the substituents may be alkyl or alkoxy and the substituents may be in the 2- or 2- and 6-positions.

The group X preferably represents an N-pyridyl group or an N-pyridyl group substituted, e.g., with one or more alkyl, carboxy, carbamoyl, etc., groups such as an N-picolinyl group, N-isonicotinyl group or N-nicotinamido group.

It is to be noted that in the preparation of the salt the group R$^1$ will not in general enter into the reaction and from this point of view is relatively unimportant. If R$^1$ contains a basic group this may also form a salt group and it will be appreciated that the amount of acid used may have to be adjusted accordingly. The group X although entering into the reaction is also relatively unimportant from this point of view.

After the reaction between the base and the acid addition salt has taken place, recovery of the betaine may be facilitated by addition of an anti-solvent, e.g. substantially anhydrous alkanols, e.g. methanol or ethanol, ethers, ketones, e.g. acetone and esters, e.g. ethyl acetate, and then collecting the resultant precipitate. Alternatively, the betaine may be recovered by direct crystallization from the reaction mixture.

The organic solvent used in this process according to the invention is preferably selected from those containing the following group:

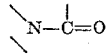

Examples of such solvents are substituted amides of the general formula R$^3$—CO.NR$^4$.R$^5$ where R$^3$ is a hydrogen atom or an alkyl group containing 1 to 5 carbon atoms and R$^4$ and R$^5$, which may be the same or different, are each an alkyl group containing 1 to 5 carbon atoms, or, alternatively, R$^4$ and R$^5$ together form a divalent aliphatic group which, together with the adjacent nitrogen atom, forms a heterocyclic ring. Examples of amides of this type are N,N-dimethylformamide, N,N-diethylformamide, N,N-dipropylformamide, N,N-dibutylformamide, N,N-dimethylacetamide, N,N-diethylacetamide, N,N-dimethylvaleramide, N,N-dimethylpropionamide, N-formylpiperidine and N-formylmorpholine. Of this group of compounds, we prefer to use N,N-dimethylacetamide or N,N-dimethylformamide. These two solvents are characterised by having good solubility power for the acid addition salts and low solubility power for the betaines. Thus when a solvent-soluble strong organic base is added to such a solution of the acid-addition salt, the betaine can be crystallized directly from the solution or on the addition of an antisolvent, e.g. methanol.

The N,N-disubstituted amide solvents are particularly to be preferred as solvents in the reaction according to the invention because they yield the betaine in crystalline forms which are relatively non-hygroscopic compared with the hygroscopic forms previously prepared and hence possess important advantages in handling and formulation.

The non-hygroscopic forms of the betaines of Formula II are novel substances and constitute a further feature of the invention. They may be characterised by their X-ray crystallographic constants and by other details given below. Slight differences between forms crystallised from, for example, N,N-dimethylformamide (DMF) and N,N-dimethylacetamide (DMA) have been observed but the invention extends to all the non-hygroscopic crystalline forms of the betaines of Formula II.

In the particular case of N-(7-2'-thienylacetamidoceph-3-em-3-ylmethyl) pyridinium-4-carboxylate different forms have been isolated from DMA and DMF and these will be termed herein, for convenience, the α- and β-forms respectively. X-ray crystallographic data in respect of these two forms are given in the following tables showing the value of 2θ° (twice the Bragg angle) and the corresponding interplanar spacings in angstroms measured from film taken on a Guinier powder X-ray camera using copper Kα-radiation. The relative intensities of the lines are also given according to the following arbitrary basis:

$s$=strong
$m$=medium
$w$=weak
$f$=faint
$v$=very
$b$=broad

TABLE I.—α-FORM

| 2θ° | d(A.) | I | 2θ° | d(A.) | I |
|---|---|---|---|---|---|
| 6.05 | 14.6 | vs (b) | 28.40 | 3.14 | m (b) |
| 11.97 | 7.38 | ms | 28.97 | 3.08 | f |
| 12.97 | 6.82 | f | 29.75 | 3.00 | w (b) |
| 13.85 | 6.39 | w | 30.20 | 2.96 | f |
| 15.57 | 5.68 | vvs | 31.67 | 2.82 | ms (b) |
| 15.90 | 5.57 | vvs | 32.30 | 2.77 | vw |
| 16.75 | 5.29 | ms (vb) | 32.80 | 2.73 | w-m |
| 18.02 | 4.92 | w | 33.50 | 2.67 | }m (vb) |
| 18.47 | 4.80 | vw | 33.77 | 2.65 | |
| 19.77 | 4.49 | ms (b) | 34.70 | 2.58 | f |
| 21.05 | 4.22 | vs (b) | 35.12 | 2.55 | w-m |
| 21.77 | 4.08 | s (b) | 35.25 | 2.54 | w |
| 22.85 | 3.89 | m (b) | 35.72 | 2.51 | w (b) |
| 23.27 | 3.82 | w | 36.35 | 2.47 | vw |
| 23.77 | 3.74 | ms | 36.90 | 2.43 | w-m |
| 24.07 | 3.69 | ms | 37.27 | 2.41 | f |
| 24.27 | 3.66 | w | 37.90 | 2.37 | f |
| 25.00 | 3.55 | vw | 38.30 | 2.35 | w (b) |
| 25.62 | 3.47 | w (b) | 38.80 | 2.32 | vw (b) |
| 26.30 | 3.38 | s | 40.15 | 2.24 | w-m (vb) |
| 26.57 | 3.35 | ms | 41.35 | 2.18 | m |
| 27.05 | 3.29 | w-m | 42.25 | 2.14 | w (vb) |
| 27.82 | 3.20 | f | | | |

TABLE II.—α-FORM

| 2θ° | d(A.) | I | 2θ° | d(A.) | I |
|---|---|---|---|---|---|
| 6.10 | 14.48 | vs | 26.90 | 3.31 | w |
| 10.62 | 8.32 | f | 27.55 | 3.24 | vw |
| 11.90 | 7.43 | ms | 28.10 | 3.17 | w |
| 13.02 | 6.79 | m | 29.10 | 3.07 | f |
| 13.70 | 6.46 | vw | 29.67 | 3.01 | ms (b) |
| 14.72 | 6.01 | w | 29.95 | 2.98 | vw |
| 15.35 | 5.77 | vvs | 31.10 | 2.87 | w-m (b) |
| 15.67 | 5.65 | vvs | 31.67 | 2.82 | m |
| 15.92 | 5.56 | w | 32.10 | 2.79 | ms |
| 16.55 | 5.35 | w-m | 32.32 | 2.77 | vw (vb) |
| 16.75 | 5.29 | f | 33.10 | 2.70 | }w (vb) |
| 17.92 | 4.94 | vs (b) | 33.40 | 2.68 | |
| 18.40 | 4.82 | w-m | 34.20 | 2.62 | f |
| 19.20 | 4.62 | f | 34.65 | 2.59 | w-m |
| 19.67 | 4.51 | w | 35.00 | 2.562 | vw |
| 20.47 | 4.33 | }vs (vb) | 35.05 | 2.558 | w |
| 20.62 | 4.30 | | 36.12 | 2.48 | w (b) |
| 21.02 | 4.22 | ms | 36.45 | 2.46 | w (b) |
| 21.70 | 4.09 | ms (b) | 36.97 | 2.43 | w |
| 22.37 | 3.97 | vvs (b) | 37.62 | 2.39 | w |
| 23.05 | 3.86 | w-m | 37.97 | 2.37 | w |
| 23.42 | 3.79 | w-m | 38.30 | 2.35 | vw |
| 24.02 | 3.70 | w-m | 38.82 | 2.32 | vw (b) |
| 24.40 | 3.65 | f | 39.27 | 2.30 | f |
| 24.52 | 3.63 | f | 39.92 | 2.26 | m |
| 24.85 | 3.58 | vw | 40.30 | 2.24 | }w (b) |
| 25.20 | 3.53 | w | 40.42 | 2.23 | |
| 25.42 | 3.50 | w | 40.77 | 2.21 | vw |
| 26.00 | 3.42 | w | 41.47 | 2.18 | f |
| 26.15 | 3.41 | w | 42.00 | 2.15 | w (vb) |
| 26.62 | 3.35 | w | 42.67 | 2.12 | m |

Figure 2:
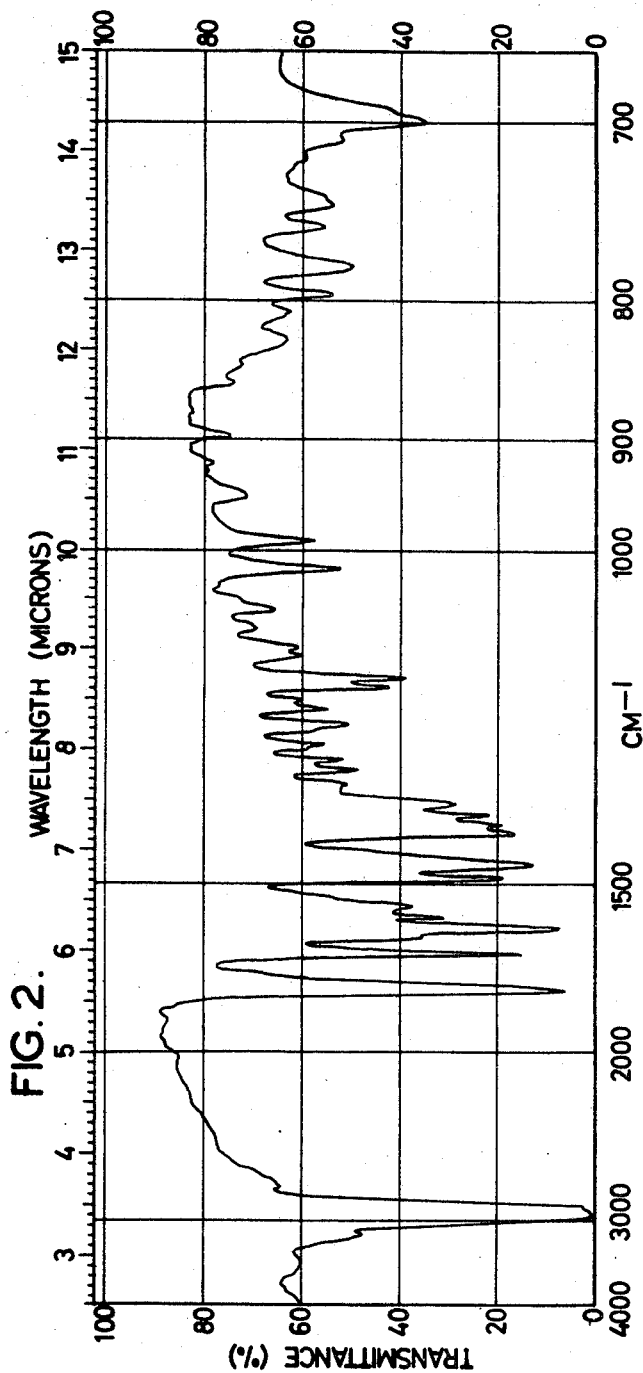

Differences also exist between the infrared spectra of the aforementioned α- and β-forms, and FIGURES 1 and 2 of the acompanying drawings show infrared spectra of Nujol mulls of these two forms respectively. For the sake of comparison, FIGURES 3 and 4 show the infrared spectra of the γ-form crystallised from methanol and the δ-form isolated from water by freeze drying respectively. It should be noted that the spectra of the γ- and δ-forms refer to material dried to the substantially solvent-free condition. The following table shows the principal absorption bands in both μ and cm.⁻¹ for the α- and β-forms as compared with those of the γ-form (crystallised from methanol) and the δ-form (isolated from water). Intensities are also shown using the same arbitary basis given above for the X-ray measurements.

Yet another group of solvents are tetraalkylureas of the general formula $R^4.R^5N.CONR^4.R^5$, where $R^4$ and $R^5$ have the meanings defined above. Examples of such substituted ureas include, N,N,N′,N′-tetramethylurea and N,N,N′,N′-tetraethylurea.

Solvents of a different type chemically which may be employed are those of the formula $R^4.R^5SO$, where $R^4$ and $R^5$ have the meanings defined above. An example of such a solvent is dimethyl sulphoxide.

Where the base used is itself a liquid and the acid addition salt is soluble therein, the base may function as the solvent for the reaction. Pyridine, for example, may be used in this way.

Where organic bases are used these are preferably liquid tertiary amines, e.g., tri(lower alkyl) amines or liquid

TABLE III

[Principal absorption bands (μ and cm.⁻¹) in the infrared spectra of Nujol mulls of α-, β-, γ- and δ-forms o N-(7-2′-thienylacetamidoceph-3-em-3-ylmethyl)-pyridinium-4-carboxylate]

| "α-form" (ex DMA) | | "β-form" (ex DMF) | | "γ-form" (ex methanol) | | "δ-form" (ex water) | |
| --- | --- | --- | --- | --- | --- | --- | --- |
| μ | Cm.⁻¹ | μ | Cm.⁻¹ | μ | Cm.⁻¹ | μ | Cm.⁻¹ |
| 3.21 m | 3,120 m | 3.21 m | 3,120 m | 3.11 m | 3,220 m | 3.08 m | 3,250 m |
| 3.32–3.51 s | 3,010–2,850 s | 3.32–3.51 s | 3,010–2,850 s | 3.40–3.52 s | 2,940–2,840 s | 3.39–3.52 s | 2,950–2,840 s |
| 5.64 s | 1,774 s | 5.63 s | 1,776 s | 5.68 s | 1,762 s | 5.68 s | 1,762 s |
| 6.00 s | 1,666 s | 5.99 s | 1,670 s | 5.91 m | 1,692 m | 5.89 m | 1,698 m |
| 6.24 s | 1,602 s | 6.24 s | 1,604 s | 6.19 s | 1,616 s | 6.17 s | 1,622 s |
| 6.34 s | 1,578 s | 6.34 s | 1,578 s | 6.34 w | 1,578 w | 6.30 m | 1,586 m |
| 6.46 s | 1,548 s | 6.45 m | 1,550 m | 6.54 s | 1,530 s | 6.52 s | 1,535 s |
| 6.69 s | 1,495 s | 6.69 s | 1,494 s | 6.64 m | 1,506 m | 6.67 s | 1,498 s |
| 6.72 s | 1,488 s | 6.84 m | 1,642 m | 6.71 s | 1,490 s | 6.83 s | 1,465 s |
| 6.84 m | 1,462 m | 7.15 s | 1,398 s | 6.83 s | 1,465 s | 7.09 m | 1,410 m |
| 6.93 m | 1,442 m | 7.35 m | 1,360 s | 7.25 s | 1,380 s | 7.24 s | 1,382 s |
| 7.15 s | 1,389 s | 7.44 m | 1,344 m | 7.36 s | 1,358 s | 7.39 s | 1,354 s |
| 7.27 s | 1,376 s | 7.63 w | 1,310 w | 7.46 s | 1,340 s | 7.48 m | 1,338 m |
| 7.34 s | 1,362 s | 7.78 m | 1,286 m | 7.55 w | 1,335 w | 7.57 m | 1,322 m |
| 7.42 m | 1,348 s | 7.86 w | 1,272 w | 7.76 m | 1,288 m | 7.75 m | 1,290 m |
| 7.51 m | 1,332 m | 8.03 w | 1,246 w | 8.13 m | 1,230 m | 7.82 w | 1,278 w |
| 7.66 w | 1,306 w | 8.23 m | 1,216 m | 8.39 m | 1,192 m | 8.15 s | 1,228 s |
| 7.78 m | 1,285 m | 8.37 w | 1,194 w | 8.62 m | 1,160 m | 8.39 m | 1,192 m |
| 7.87 m | 1,270 m | 8.61 m | 1,162 m | 8.70 m | 1,150 m | 8.61 s | 1,162 s |
| 8.08 w | 1,238 m | 8.71 m | 1,148 m | 9.07 m | 1,103 m | 8.89 w | 1,125 w |
| 8.20 m | 1,220 m | 8.93 m | 1,120 w | 9.36 w | 1,068 w | 9.01 w | 1,110 w |
| 8.36 w | 1,196 w | 9.03 w | 1,108 w | 9.64 w | 1,038 w | 9.23 w | 1,083 w |
| 8.48 m | 1,180 m | 9.36 m | 1,068 w | 9.88 m | 1,012 m | 9.39 w | 1,065 w |
| 8.62 m | 1,160 m | 9.80 m | 1,020 m | 10.18 w | 982 w | 9.64 w | 1,038 w |
| 8.77 m | 1,148 m | 10.08 w | 992 w | 10.50 w | 952 w | 9.88 m | 1,012 m |
| 8.87 w | 1,128 w | 10.55 w | 948 w | 11.76 w | 850 w | 10.05 w | 995w |
| 8.93 w | 1,120 w | 11.17 w | 895 w | 12.22 w | 818 w | 10.53 w | 950 w |
| 9.26 w | 1,080 w | 12.12 w | 825 w | 12.58 w | 795 w | 11.17 w | 895 w |
| 9.38 w | 1,066 w | 12.38 w | 808 w | 12.99 m | 770 m | 11.74 w | 852 w |
| 9.80 m | 1,020 m | 12.58 w | 795 w | 13.66 m | 732 m | 12.42 w | 805 w |
| 10.04 w | 996 m | 12.85 m | 778 m | 14.71 m | 680 m | 12.69 w | 788 w |
| 10.62 w | 942 w | 13.23 w | 756 w | | | 12.90 m | 775 m |
| 11.16 w | 896 w | 13.51 w | 740 w | | | 13.37 w | 748 w |
| 11.66 w | 858 w | 14.33 m | 698 m | | | 13.66 m | 732 m |
| 11.96 m | 836 m | | | | | 14.12 w | 708 w |
| 12.50 w | 800 w | | | | | 14.71 m | 680 m |
| 12.63 w | 792 w | | | | | | |
| 12.85 m | 778 m | | | | | | |
| 13.21 w | 757 w | | | | | | |
| 13.40 w | 746 w | | | | | | |
| 13.55 w | 738 w | | | | | | |
| 13.93 s | 718 s | | | | | | |
| 14.45 m | 692 m | | | | | | |
| 15.38 w | 650 w | | | | | | |

The γ- and δ-forms isolated from methanol and water respectively are hygroscopic. It should be noted that if an alcohol, such as methanol, is used as the anti-solvent to increase crystallisation of the betaine from the substituted amide solvent, the product is hygroscopic. It is preferred to obtain the non-hygroscopic crystals by effecting partial crystallisation of the betaine from the substituted amide solvent and then effecting further crystallisation by the addition of a quantity of a lower ketone, e.g. acetone, before harvesting the desired non-hygroscopic crystals. The amount of ketone employed and the rate at which it is added must be carefully regulated if non-hygroscopic crystals of the betaine are to be obtained. The optimum amount may be ascertained by preliminary trial. It has been observed that when acetone is used with dimethylacetamide, the betaine is sometimes obtained as a mixture of non-hygroscopic forms. This does not, however, significantly affect the handling and formulating characteristics of the product.

Another convenient group of solvents are the N,N-dialkylcyanamides, e.g. N,N-dimethylcyanamide.

secondary amines, e.g., the products sold under the trademarks "Amberlite LA₂" and "Amberlite LA₁." These are high molecular weight secondary amines and are almost insoluble in water.

Organic bases may be used as such or as a solution in an inert organic solvent.

As an alternative to using organic bases one may use inorganic bases provided that these are otherwise inert to the cephalosporin derivative. Inorganic bases which may be used include alkali metal and alkaline earth metal carbonates and bicarbonates. These may be used in aqueous solution or in solid form.

The regeneration and recovery process according to the invention may conveniently be effected at a temperature in the range of 5–60° C.

The process according to the invention may be utilised with advantage in the manufacture of N-(7-acylamidoceph-3-em-3-ylmethyl)pyridinium - 4 - carboxylates in a process involving the use of thiocyanate or iodide ions. Thus, Belgian Patent No. 652,148 describes in Example 10 a process for the production of cephaloridine, involving the condensation of 7-2'-thienylacetamidocephalosporanic acid with pyridine in an aqueous acidic medium containing potassium thiocyanate. The cephaloridine is recovered from the reaction mixture by treatment with a liquid anion exchanger in the acetate form. This process and variations on it as described in Belgian Patent No. 675,299 lead to an enhanced yield of the cephalosporin $C_A$ compound but the purity of the latter leaves much to be desired.

We have now found that N-(7-acylamidoceph-3-em-3-yl-methyl) pyridinium-4-carboxylates can be prepared in a high state of purity and good yield by an extension of the general process we have described by a process which includes the following steps:

(A) Reacting a 7-acylamidocephalosporanic acid or a metal salt thereof, particularly an alkali metal salt, with a pyridine in solution in a reaction medium in the presence of an at least equimolar proportion, calculated on the 7-acylamidocephalosporanic acid, of thiocyanate or iodide ions and recovering the resultant N-(7-acylamidoceph-3-em-3-yl-methyl) pyridinium-4-carboxylate as its crude hydrothiocyanate or hydroiodide acid addition salt;

(B) Converting the crude hydrothiocyanate or hydroiodide acid addition salt from (A) to the betaine form by reacting said salt with a base, the betaine being recovered in an aqueous phase and thiocyanate or iodide impurities preferably being separated in an organic phase;

(C) If desired, passing the aqueous phase from (B) through one or more ion-exchangers and, if desired, decolourising absorbents to remove further impurities, e.g., acidic and basic impurities as well as colourants;

(D) Reacting the aqueous phase from (B) or (C) with an acid, particularly nitric acid, to form an insoluble acid addition salt;

(E) Separating the acid addition salt from (D) from the mother liquor and converting the salt to the betaine form by reaction with a base.

The acyl group on the 7-amino group of the desired product and the pyridinium substituent on the 3-methyl group may be any of those described above.

The betaine resulting from Step (B), i.e., on reacting the hydrothiocyanate or hydroiodide acid addition salt with a base, is considerably less pure than that obtained by treating the acid addition salt of Step (D) with a base as in Step (E). The betaines from Step (B) are quite unsatisfactory for more or less direct use as pharmaceutical grade cephalosporin $C_A$ compounds because of residual impurities such as thiocyanate or iodide ions and traces of the corresponding $\Delta^2$ isomer and other impurities which are present at the end of Step (B). The acid addition salts of Step (D) and in particular the hydronitrate salt on the other hand are crystalline intermediates which are relatively free from contaminants and which give remarkably pure products on treatment with a base.

STEP (A)

The reaction is desirably effected in the presence of a large proportion of thiocyanate or iodide ions so that not only is there a high ratio of said ions to 7-acylamidocephalosporanic acid starting material, preferably in a ratio of at least 2:1 and possibly up to 25:1 but preferably also a high concentration of said ions in the aqueous reaction medium. Higher molar ratios at high concentration are possible with thiocyanates than with iodides. Thus with alkali metal thiocyanates molar ratios of up to 25:1 can be used at high concentration. The thiocyanate or iodide is conveniently used as an alkali metal, or alkaline earth metal salt, e.g. the sodium or potassium salt. The pyridine is conveniently used at a level of from about 1.3 equivalents and upwards based on the cephalosporin starting material. The latter may be used as the free acid but is conveniently used as an alkali metal, e.g. sodium salt. The reaction of Step (A) may be effected at from 40° C. to 100° C.

Step (A) may be effected in solution in an aqueous reaction medium or in solution in an organic reaction medium. The number of organic solvents which may be used is limited having regard to the diverse solubility characteristics of the various reagents. It is not necessary that the reactants should dissolve in the chosen medium at room temperature but they should be soluble at the chosen reaction temperature. Organic solvents which can be used are necessarily highly polar but polarity in itself is not a governing factor. Organic solvents which may be used include formamide, N-methylformamide, N,N-dimethylformamide and dimethylsulphoxide.

At the end of Step (A) the hydrothiocyanate or hydroiodide salt is obtained from the reaction mixture, or from an aqueous phase derived therefrom, conveniently by acidifying and cooling to precipitate the desired salt.

STEP (B)

The conversion of the hydrothiocyanate or hydroiodide from (A) to the betaine is preferably effected by means of a two phase system, an aqueous phase for the recovery of the betaine and a water-immiscible organic phase containing an ion-exchanger for the removal of thiocyanate or iodide ions. This may conveniently be effected by contacting the acid addition salt recovered from (A) with water and a water-immiscible basic ion-exchanger. The resultant mixture is then agitated until the acid addition salt goes into solution, the resulting mixture is then agitated with a water-immiscible organic solvent, the phases are separated and the aqueous betaine-containing phase is, if necessary, further extracted with a water-immiscible organic phase containing basic ion-exchanger to remove further thiocyanate or iodide ions and also, if desired, further extracted with a water-immiscible organic solvent. A suitable basic ion-exchanger for this step is "Amberlite" LA–1 or "Amberlite" LA–2. Suitable organic solvents include halogenated aliphatic hydrocarbons, e.g., carbon tetrachloride, methylene chloride, dichloroethane or chloroform.

The betaine so obtained is impure. It contains as impurities thiocyanate or iodide ions, traces of the corresponding 7-acylamidocephalosporanic acid and $\Delta^2$ cephalosporins and other minor impurities.

If in Step (D) the hydronitrate is formed this step may be omitted but, even when proceeding via the hydronitrate, it is advantageous to utilise this step to remove further impurities, particularly acidic impurities e.g., free 7-acylamidocephalosporanic acid, basic impurities, e.g., the cephalosporin $C_A$ compound in decarboxylated form and colourants. This purification step is conveniently effected by passing the aqueous phase from Step (B) through a column containing, in any desired order, a mineral absorbent, e.g. alumina, to remove colourants; a cation-exchanger, e.g. "Zeo-Karb" 226 (a weak cation-exchange resin prepared by direct polymerisation of methacrylic acid and divinylbenzene) to remove basic impurities and an anion-exchanger, e.g., Deacidite FF or Dowex 1X8 (strong anion-exchange resins prepared from cross-linked polystyrene resin beads by treating them with chloromethyl methyl ether followed by treatment with a tertiary amine) to remove acidic impurities.

STEP (D) AND STEP (E)

The production of hydronitrate or other acid addition salt, e.g. hydroperchlorate, hydrotetrafluoroborate, hydroiodide, hydrotrichloroacetate or hydrothiocyanate of cephalosporin $C_A$ compounds and the subsequent regeneration therefrom of the parent betaine in substantially pure crystalline form is described in the general description above.

We particularly prefer the hydronitrate as it forms a well-defined crystalline material enabling one to regenerate the betaine therefrom in a high state of purity.

The conversion of the hydronitrate to the parent betaine may be effected in solution or suspension in an organic solvent, e.g. an N,N disubstituted acid amide, e.g. dimethylacetamide or dimethylformamide, by reaction therein with a base, preferably a strong organic base, to form a soluble acid addition salt of said base and recovering the betaine from the reaction mixture as described above or as described in U.S. Patent No. 3,280,118.

In order that the invention may be well understood the following examples are given by way of illustration only. The hydronitrate salt of N-(7-2'-thienylacetamidoceph-3-em-3-ylmethyl) pyridinium-4-carboxylate (see Example 5 of U.S. No. 3,280,118) employed is used only for the purpose of illustration and the invention is not limited to the use of this particular betaine or to hydronitrate salts.

EXAMPLE 1

Triethylamine (20.4 g.; 0.202 mole) was added to a stirred solution of N-(7-2'-thienylacetamidoceph-3-em-3-ylmethyl) pyridinium-4-carboxylate hydronitrate (78 g., 0.163 mole) in N,N-dimethylacetamide (195 ml.). Two minutes after the addition of triethylamine, methanol (780 ml.) was added to the reaction mixture and the stirring was continued for a further ninety minutes. The precipitate was collected by filtration, washed with methanol (350 ml.), diethyl ether (350 ml.) by displacement and dried in vacuo at 40° to constant weight to give N-(7-2'-thienylacetamidoceph-3-em-3-ylmethyl) pyridinium-4-carboxylate (60.7 g., 89.7% of theory) with $[\alpha]_D^{20} + 47.7°$ (c., 1 in water), pH 4.8 (c., 1 in water)

$\lambda_{max.}^{H_2O}$ at 240 m$\mu E_{1cm.}^{1\%}$ 377, inflection at 255 m$\mu E_{1cm.}^{1\%}$ 344, ratio $\frac{\text{E at 240}}{\text{E at 255}}$ 1.095 and giving clear solutions in water from 1% to 20% concentrations.

EXAMPLE 2

A solution of triethylamine (0.63 g., 6.25 millimoles) in methanol (24 ml.) was added to a solution of N-(7-2'-thienylacetamidoceph-3-em-3-ylmethyl) pyridinium - 4 - carboxylate hydronitrate (2.4 g.; 4.98 millimoles) in N,N-dimethylformamide (6 ml.) and the reaction mixture was allowed to stand at room temperature for 1 hour with occasional swirling. The crystalline precipitate was collected by filtration, washed with methanol (10 ml.), diethyl ether (10 ml.) by displacement and dried in vacuo at 40° to constant weight to give N-(7-2'-thienylacetamidoceph-3-em-3-ylmethyl) pyridinium - 4 - carboxylate (1.818 g., 87.5% of theory) with $[\alpha]_D^{20} + 48.4°$ (c., 1 in water), pH 4.8 (c., 1 in water), $\lambda_{max.}^{H_2O}$ at 240 m$\mu E_{1cm.}^{1\%}$ 372, inflection at 255 m$\mu E_{1cm.}^{1\%}$ 341, ratio $\frac{\text{E at 240}}{\text{E at 255}}$ 1.09 and giving clear solutions in water from 1% to 20% concentrations.

EXAMPLE 3

Triethylamine (1.01 g.; 10 millimoles) was added to a solution of N - (7-2'-thienylacetamidoceph-3-em-3-ylmethyl) pyridinium-4-carboxylate hydronitrate (2.4 g.; 4.98 millimoles) in dimethylsulphoxide (6 ml.). Methanol (3 ml.) was added to obtain a homogeneous reaction mixture. After 10 minutes, further methanol (17 ml.) was added portionwise to the stirred reaction solution to give a clear solution from which the product precipitated. The reaction mixture was stirred occasionally during one hour. The precipitate was then collected by filtration washed with methanol (20 ml.) by displacement and dried in vacuo to give N-(7-2'-thienylacetamidoceph-3-em - 3 - ylmethyl) pyridinium-4-carboxylate (1.823 g.; 86.6% of theory) with $[\alpha]_D^{20} + 46.4°$, pH 4.9 (c., 1 in water), giving clear solutions for concentrations of 1% to 20% in water.

EXAMPLE 4

Triethylamine (2.1 ml.; 1.52 g.; 15 millimoles) was added to a stirred solution of N-(7-2'-thienylacetamidoceph-3-em-3-ylmethyl) pyridinium-4-carboxylate hydronitrate (4.8 g.; 9.96 millimoles) in N,N-dimethylacetamide (48 ml.) and seeded with N-(7-2'-thienylacetamidoceph-3-em-3-ylmethyl)pyridinium-4-carboxylate. The reaction solution was stirred at room temperature for two hours during which time the product crystallised out. The precipitate was collected by filtration and washed with N,N-dimethylacetamide (6 ml.) and then with acetone (20 ml.) by displacement and dried in vacuo at 40° for 2 hours and then for 16 hours at 30° to give N-(7-2'-thienylacetamidoceph-3-em-3-ylmethyl) pyridinium-4-carboxylate (3.16 g. 75.6% of theory) with $[\alpha]_D^{20} + 47.4°$; pH 4.5 (c., 1 in water) giving clear solutions at 1% to 20% concentrations in water.

EXAMPLE 5

N-(7-2'-thienylacetamidoceph-3-em-2-ylmethyl) pyridinium-4-carboxylate hydronitrate (1 g.; 2.09 millimoles) was dissolved with stirring in a mixture of pyridine (5 ml.; 4.9 g.; 62 millimoles) and methanol (5 ml.) at 40° C. After 15 minutes the precipitate was collected by filtration, washed with a 1:1 mixture of pyridine and methanol (10 ml.), methanol (20 ml.) and dried in vacuo at 40° to constant weight to give N-(7-2'-thienylacetamidoceph-3-em-3-ylmethyl)-pyridinium-4-carboxylate (0.45 g.; 52% of theory) with $[\alpha]_D^{20} + 45°$, pH 4.6 (c., 1, in water) and containing less than 2% of the hydronitrate by potentiometric titration.

EXAMPLE 6

Anhydrous sodium carbonate (0.53 g.; 5.025 millimoles) was added to a solution of the hydronitrate (4.8 g.; 10.05 millimoles) of N(7-2'-thienylacetamidoceph-3-em-3-ylmethyl) pyridinium-4-carboxylate in N,N-dimethylacetamide (25 mls.) and the suspension was stirred at 40° for 45 minutes. The reaction mixture was clarified by filtration. The filtrate was "seeded" with a small quantity of N-(7-2'-thienylacetamidoceph-3-em-3-ylmethyl) - pyridinium-4-carboxylate and stirred at room temperature for 30 minutes but no precipitate formed. Methanol (70 ml.) was then added to the stirred solution and a precipitate slowly formed. After 1 hour the precipitate was collected by filtration, washed with methanol (40 ml.), and dried in vacuo at 30° for 24 hours to give N-(7-2'-thienylacetamido-ceph-3-em-3-ylmethyl) pyridinium - 4 - carboxylate (2.88 g., 69% of theory) with $[\alpha]_D^{20} + 47.8°$, pH 3.6 (c., 1 in water)

$\lambda_{max.}^{H_2O}$ at 240 m$\mu$ $E_{1cm.}^{1\%}$ 366, $\lambda$ infl. at 255 m$\mu$ $E_{1cm.}^{1\%}$ 336

Potentiometric titration showed the possible presence of approximately 3.5% of N-(7-2'-thienylacetamido-ceph-3-em-3-ylmethyl)-pyridinium-4-carboxylate hydronitrate.

EXAMPLE 7

N-(7-2'-thienylacetamidoceph-3-em-3-ylmethyl) pyridinium-4-carboxylate hydronitrate (9.6 g.) was dissolved in N,N'-dimethylacetamide (50 ml.). Triethylamine (3.1 ml.) was added with continued stirring. The N-(7-2'-thienylacetamidoceph-3-em-3-ylmethyl) pyridinium-4-carboxylate was collected by filtration, washed with 1:1 acetone/dimethylacetamide mixture (25 ml.), followed by acetone (100 ml.) and dried at 30° in vacuo for 16 hours. Yield 7.54 g., 90.6% theory, $[\alpha]_D + 46.7°$ (c., 1.0 in water), pH 47.5 (c., 1.0 in water).

In Examples 8 and 9 specific rotations of cephaloridine hydronitrate, hydrothiocyanate and hydroiodide were carried out in 0.1M-potassium hydrogen phosphate solution adjusted to pH 7 by the addition of orthophosphoric acid. The above solutions were diluted with water for determination of ultraviolet absorption on a Unicam SP800 Spectrophotometer.

EXAMPLE 8

A mixture of sodium 7-2'-thienylacetamidocephalosporanate (100 g. 94% pure), potassium thiocyanate (450 g.), water (100 ml.), pyridine (25 ml.) and 85% phosphoric acid (5 ml.) was stirred at 60° for 5 hours.

The mixture was diluted with water (3.9 litres) and extracted three times with dichloroethane (each 100 ml.). The extracts were backwashed successively with water (100 ml.). The combined solution and backwash were degassed under reduced pressure to remove dichloroethane, cooled to 0° C., and adjusted to pH 2 with 6N-hydrochloric acid (85 ml.). The suspension was stirred at 0° C. for one hour and the crude cephaloridine hydrothiocyanate collected by filtration and washed with ice-cold water (500 ml.).

The wet filter cake (270 g.) was stirred with water (170 ml.), acetone (180 ml.) and Amberlite LA-2 (90 ml.) until all the solid had dissolved. The mixture was diluted with water (325 ml.) and extracted with carbon tetrachloride (450 ml.). The separated aqueous layer was extracted twice with Amberlite LA 2 (9 ml.) in carbon tetrachloride (90 ml.) and twice with carbon tetrachloride (90 ml.). The extracts were backwashed successively with water (75 ml.). The combined aqueous solutions were degassed under reduced pressure, made up to 1% (v./v.) pyridine, and passed down a column of alumina (50 g., Woelm acid) on Zeo-Karb 226 (50 ml., pyridine form) and Dowex 1X8 (50 ml., acetace form) prepared in 1% vol./vol. pyridine, and eluted with 1% vol./vol. pyridine. The solution was collected until $[\alpha]_D$ (1 dm.) was 0.05° and 4N-nitric acid (180 ml.) added. The resulting suspension was cooled to 0° C., for 2 hours and the cephaloridine hydronitrate collected by filtration, washed with acetone (300 ml.) and dried at 40° in vacuo to give a white crystalline product, 68.35 g., 64% theory $[\alpha]_D + 41.3°$ λ max. 238 mμ;

$E_{1\,cm.}^{1\%}$ 331; λ infl. 255 mμ; $E_{1\,cm.}^{1\%}$ 303

Lovibond colour (1 g., +4 ml. N-sodium acetate solution; 1 cm. cell) 0.4 yellow, 0.1 red. Flectrophoresis showed that the product contained a trace of impurity (the corresponding Δ²-compound) running slightly faster than the cephaloridine.

Cephaloridine hydronitrate (60 g.) from above, was dissolved in N,N-dimethylacetamide (D.M.A.) (300 ml.), and the solution was stirred rapidly, while triethylamine (26.25 ml., 1.5 molar equiv.) was added, and then slowly for one hour, during which time a crystalline precipitate was formed. The reaction mixture remained pale in colour and the precipitate was collected by filtration, washed by displacement with D.M.A. (150 ml.), followed by acetone, (720 ml.) and dried in vacuo at 40° C. The white product (41.35 g., 80% of theory) had $[\alpha]_D + 48.1°$ (c., 1 in water); pH 4.7 on 1% solution in water, λ max. (H₂O) 240 mμ;

$E_{1\,cm.}^{1\%}$ 387; inflection at 255 mμ; $E_{1\,cm.}^{1\%}$ 355

Lovibond colour (1 g. +4.4 ml. water; 1 cm. cell), 0.6 yelow, 0.1 red. Electrophoresis showed that the product contained only a trace of impurity (the corresponding Δ²-compound) running slightly faster than the cephaloridine.

Acetone (5 volumes) was added to the mother liquors which were cooled to 0° to obtain poorer quality cephaloridine (8.85 g., 17.1% theory).

EXAMPLE 9

(a) Preparation of cephaloridine hydronitrate from sodium 7-2'-thienylacetamidocephalosporanate via the hydroiodide A mixture of sodium 7-2'-thienylacetamidocephalosporanate (20 g., 94% pure), potassium iodide (30 g.), distilled water (20 ml.), pyridine (5 ml.) and orthophosphoric acid (0.5 ml., 88%) was stirred at 60° C. for 5 hours. The resultant syrupy solution was diluted with distilled water (380 ml.) and extracted with 1,2-dichloroethane (3×20 ml.) and the extracts were back extracted with water (20 ml.). The aqueous layers were degassed under reduced pressure at 25–30° C. and acidified to the cloud-point with 6 N-hydrochloric acid. The cloudy solution was cooled to <5° C. and slowly acidified to <pH 2 with 6 N-hydrochloric acid (total volume—20 ml.). After 2 hours at 2° C. the precipitate was collected by filtration, washed by displacement with ice-cold distilled water (100 ml.), and sucked dry using a water pump vacuum. The wet filter cake was stored in the dark overnight and then shaken with Amberlite LA–2 (20 ml.), acetone (40 ml.) until all the solid had dissolved. Distilled water (100 ml.) and carbon tetrachloride (100 ml.) were added to the mixture which was shaken vigorously and then allowed to settle. The aqueous layer was run off, re-extracted twice with Amberlite LA–2 (2 ml.) in carbon tetrachloride (20 ml.) and then with carbon tetrachloride (2×20 ml.). The extracts were successively back-extracted with water (30 ml.). The combined aqueous layers were degassed under reduced pressure at 25 to 30° C. and then swirled for ten minutes with alumina (Woelm acid; 4 g.). To the suspension, pyridine (1 ml./100 ml. of solution) was added and the mixture was passed through a column of alumina (20 g., Woelm acid). Zeo-Karb 226 (20 ml., pyridine form), Deacidite FF (20 ml., acetate form) made up in 1% (v./v.) pyridine, and eluted with 1% (v./v.) pyridine. The eluate containing the product (judged by $\alpha_D$) wave collected and 4 N-nitric acid (40 ml.) was added.

The resultant suspension was stored at 2° C. for several hours, the precipitate was collected by filtration and washed by displacement with acetone. The white crystalline product was dried in vacuo at 40° to give cephaloridine hydronitrate (10.6 g.) in 49% yield with $[\alpha]_D 41.3°$ and λ max. (pH7) 238 mμ $E_{1\,cm.}^{1\%}$ 329 λ inflection 255 mμ: $E_{1\,cm.}^{1\%}$ 298;

(b) Preparation of cephaloridine from cephaloridine hydronitrate

This was effected by the same process as in Example 8.

EXAMPLE 10

(a) Preparation of cephaloridine hydronitrate in formamide

Potassium thiocyanate (90 g.), formamide (40 ml.) and pyridine (7 ml., 87 mmol) were stirred together at 80° and sodium 7 - 2' - thienylacetamidocephalosporanate (20 g., 97% pure) was added to the suspension. After 1.75 hours at 80° the reaction suspension was diluted with water (600 ml.) and the resultant solution was adjusted to pH 3.5 with 6 H-hydrochloric acid (15 ml.), and kieselguhr (1 g.) was added to the stirred suspension. The suspension was clarified by filtration and the stirred filtrate was cooled to 0°, acidified to pH<2 with 6 N-hydrochloric acid (15 ml.) and stirred at 0° for 3 mins. The precipitate was collected by filtration and washed by displacement with ice-cold water (100 ml.) and sucked as dry as possible at the pump. The crude cephaloridine hydrothiocyanate (80 g.) was dissolved in acetone (50 ml.), liquid anion exchange resin LA–2 (10 ml.) at 40°, and then LA–2 (10 ml.), carbon tetrachloride (50 ml.) and water (70 ml.) were added and the mixture was shaken thoroughly and allowed to separate. The LA–2/carbon tetrachloride layer was run off and the aqueous layer was washed twice with LA–2 in carbon tetrachloride (3.5 ml. in 20 ml.) and finally with carbon tetrachloride (20 ml.). The washes were back-extracted with water (20 ml.) and the combined aqueous layers were degassed at 30° for 30 mins. under reduced pressure with alumina (4 g., Woelm acid) present. Pyridine (1.0 ml.) was added to the degassed suspension which was added to the top of a column of alumina Woelm acid (10 g.), Zeo-Karb 225 (pyridine form; 10 ml.) and Deacidite FF (acetate form; 10 ml.) made up in 1% pyridine in water and eluated with 1% pyridine as in Example 1. To the eluate containing cephaloridine (300 ml.) mixed with ethyl acetate (60 ml.), 4 N-nitric acid (40 ml.) was added and the suspension was stored at 0° for 30 mins. The precipitate was collected by filtration, washed thoroughly with acetone and dried in vacuo at 40° for 16 hours to give substantially pure cephaloridine hydronitrate (14.67 g.) in 66% yield.

(b) Preparation of cephaloridine from cephaloridine hydronitrate

This was effected by the same process as in Example 8.

EXAMPLE 11

(a) Preparation of cephaloridine hydronitrate in N-methylformamide

Sodium iodide (25 g.), N-methylformamide (20 ml.) and pyridine (5 ml.) were stirred together at 80° and sodium 7-2'-thienylacetamidocephalosporanate (10 g.; 97% pure) was added to the mixture. After three hours at 80° the reaction solution was diluted with water (300 ml.) and the pH of the resultant solution was adjusted to 3.5 with 6 N-hydrochloric acid. Kieselguhr (1 g.) was added, the suspension was stirred at 25° for 30 minutes and then filtered. The clear filtrate was cooled to 0°, acidified to pH<2 with 6 N-hydrochloric acid (ca. 10 ml.) and the suspension stirred at 0° for 30 minutes. The precipitate was collected by filtration, washed by displacement with ice-cold water (50 ml.) and sucked as dry as possible on the filter. The method described in Example 10 for the treatment of the hydrothiocyanate was used to convert the crude caphaloridine hydroiodide to purified cephaloridine hydronitrate (7.045 g.) in 63.2% overall yield.

(b) Preparation of cephaloridine from cephaloridine hydronitrate

This was effected by the process of Example 12 of U.S. Patent No. 3,280,118.

EXAMPLE 12

(a) Preparation of cephaloridine hydronitrate in dimethyl sulphoxide

Potassium thiocyanate (30 g.), dimethyl sulphoxide (20 ml.) and pyridine (4.5 ml.) were stirred at 80° while sodium 7 - 2' - thienylacetamidocephalosporanate (10 g.; 97%) was added. The reaction mixture was stirred at 80° for two hours and was then cooled to 20°. The resultant red solution was diluted with water (300 ml.) and acidified to pH 3.5 with 6 N-hydrochloric acid (ca. 8 ml.). Kieselguhr (2 g.) was added to the cloudy solution and after ten minutes the solution was clarified by filtration. The clear yellow filtrate was cooled to 0°, acidified with 6 N-hydrochloric acid (8 ml.) and after 30 minutes at 0° the precipitated cephaloridine hydrothiocyanate was collected by filtration and washed well with cold water. The method described in Example 8 was used to convert the crude hydrothiocyanate into purified cephaloridine hydronitrate (5.6 g.; 50.4% theory) with $[\alpha]_D + 39.8°$ (c., 0.5; 0.1M, pH 7 buffer);

$\lambda$ max. 238 m$\mu$ $E_{1\,cm.}^{1\%}$ 312; $\lambda$ infl. 255 m$\mu$ $E_{1\,cm.}^{1\%}$ 290

(b) Preparation of cephaloridine from cephaloridine hydronitrate

This was effected as in Example 8.

EXAMPLE 13

Proceeding generally as described in Example 12 but using N,N-dimethylformamide in place of dimethylsulphoxide, yields of cephaloridine hydronitrate of 51.9% and 57.9% theory were obtained in (a) using potassium thiocyanate and sodium iodide respectively. The hydronitrates were then converted to cephaloridine as described in Example 8.

We claim:

1. A process for regeneration and recovery of the betaine, N-(7 - 2' - thienylacetamidoceph-3-em-3-ylmethyl)-pyridinium - 4 - carboxylate, from an acid addition salt thereof with an acid having a pKa of not greater than 4 which comprises contacting with an organic base having a pKb of less than 6, a solution of said salt in an organic solvent selected from the group consisting of an N-alkyl substituted amide, an N,N - dialkylcyanamide, a tetraalkylurea, a dialkyl sulphoxide and said base when liquid and said salt is soluble therein, thereby forming a solution of an acid addition salt of said base in said solvent and recovering said betaine from the organic medium.

2. A process for the regeneration and recovery of the betaine, N-(7-2'-thienylacetamidoceph-3-em-3-ylmethyl)-pyridinium - 4 - carboxylate, from an acid addition salt thereof with an acid having a pKa of not greater than 4 which comprises contacting with an organic base having a pKb of less than 6, a solution of said salt in an organic solvent selected from the group consisting of an N-alkyl substituted amide, an N,N-dialkylcyanamide, a tetraalkylurea, a dialkyl sulphoxide and said base when liquid and said salt is soluble therein, thereby forming a solution of an acid addition salt of said base in said solvent and recovering said betaine from the organic medium by direct crystallisation.

3. A process for the regeneration and recovery of the betaine, N-(7-2'-thienylacetamidoceph-3-em-3-ylmethyl)-pyridinium - 4 - carboxylate, from an acid addition salt thereof with an acid having a pKa of not greater than 4 which comprises contacting with an organic base having a pKb of less than 6, a solution of said salt in an organic solvent selected from the group consisting of an N-alkyl substituted amide, an N,N-dialkylcyanamide, a tetraalkylurea, a dialkyl sulphoxide and said base when liquid and said salt is soluble therein, thereby forming a solution of an acid addition salt of said base in said solvent; adding an antisolvent for the betaine to the organic medium and recovering the precipitated betaine.

4. A process for the regeneration and recovery of the betaine, N-(7-2'-thienylacetamidoceph-3-em-3-ylmethyl)-pyridinium - 4 - carboxylate, from an acid addition salt thereof with an acid having a pKa of not greater than 4 which comprises contacting a solution of said salt in a solvent of the formula $R^3.CO.NR^4.R^5$ where $R^3$ is selected from the group consisting of hydrogen and alkyl groups containing 1–5 carbon atoms and $R^4$ and $R^5$ are each an alkyl group containing 1–5 carbon atoms, with an organic base having a pKb of less than 6 to form a solution of an acid addition salt of said base in said solvent and recovering said betaine from the organic medium.

5. A process as defined in claim 4 in which said acid is nitric acid.

6. A process as defined in claim 4 in which said solvent is dimethylformamide.

7. A process as defined in claim 4 in which said solvent is dimethylacetamide.

8. A process as defined in claim 4 in which the betaine is recovered by direct crystallisation.

9. A process as defined in claim 4 in which the betaine is recovered by contacting the solvent with a lower ketone and recovering the precipitated betaine.

10. A process for the regeneration and recovery of the betaine, N-(7 - 2' - thienylacetamidoceph-3-em-3-ylmethyl)pyridinium-4-carboxylate, from an acid addition salt thereof with an acid having a pKa of not greater than 4 which comprises contacting a solution of said salt in a solvent of the formula:

$R^4.R^5SO$ where $R^4$ and $R^5$ are each an alkyl group containing 1–5 carbon atoms, with an organic base having a pKb of less than 6 to form a solution of an acid addition salt of said base in said solvent and recovering said betaine from the organic medium.

11. A process for the regeneration and recovery of the betaine, N-(7 - 2' - thienylacetamidoceph-3-em-3-yl-methyl)pyridinium-4-carboxylate, from an acid addition salt thereof with an acid having a pKa of not greater than 4 which comprises contacting a solution of said salt in a solvent of the formula:

$$R^3.CO.NR^4.R^5$$

where $R^3$ is selected from the group consisting of hydrogen and alkyl groups containing 1–5 carbon atoms and $R^4$ and $R^5$ are each alkyl groups containing 1–5 carbon atoms, with an organic tertiary base having a pKb of less than 6 to form a solution of an acid addition salt of said base in said solvent and recovering said betaine from the organic medium.

12. A process as defined in claim 11 in which said base is a tri(loweralkyl)amine.

13. A process for the regeneration and recovery of the betaine, N-(7-2'-thienylacetamidoceph-3-em-3-ylmethyl)-pyridinium-4-carboxylate, from its hydronitrate salt which comprises contacting a solution of said salt in N,N-dimethylacetamide with a tri(loweralkyl)amine and recovering said betaine from said solvent.

14. A process for the regeneration and recovery of the betaine, N-(7-2'-thienylacetamidoceph-3-em-3-ylmethyl)-pyridinium-4-carboxylate, from its hydronitrate salt which comprises contacting a solution of said salt in N,N-dimethylformamide with a tri(loweralkyl)amine and recovering said betaine from said solvent.

15. In a process for the preparation of N-(7-2'-thienyl-acetamidoceph-3-em-3 - ylmethyl) pyridinium-4-carboxylate the steps which include
  (A) reacting 7 - 2' - thienylacetamidocephalosporanic acid or an alkali metal salt thereof with pyridine in solution in a reaction medium in the presence of an at least equimolar proportion, calculated on the 7-acylamidocephalosporanic acid, of thiocyanate or iodide ions and recovering the resultant N-(7-2'-thienylacetamidoceph-3-em - 3 - ylmethyl) pyridinium-4-carboxylate as its crude hydrothiocyanate or hydroiodide acid addition salt;
  (B) converting the crude hydrothiocyanate or hydroiodide acid addition salt from (A) to the betaine form by contacting said salt with a base, the betaine being recovered in an aqueous phase;
  (C) if desired passing the aqueous phase from (B) through at least one ion-exchanger and, if desired, decolourising absorbent;
  (D) reacting the aqueous phase from (B) or (C) with an acid having a pKa of not greater than 4 to form an insoluble acid addition salt;
  (E) separating the acid addition salt from (D) from the mother liquor and converting the salt to the betaine form by contacting with an organic base having a pKb of less than 6, a solution of said acid addition salt in an organic solvent selected from the group consisting of an N-alkyl substituted amide, an N,N-dialkylcyanamide, a tetraalkylurea, a dialkyl sulphoxide and said base when liquid and said salt is soluble therein, thereby forming a solution of an acid addition salt of said base in said solvent; and
  (F) recovering said betaine from the organic medium.

16. A process for the preparation N-(7-2'-thienylacetamidoceph-3-em-3-ylmethyl) pyridinium-4 - carboxylate which includes the following steps:
  (A) reacting an alkali metal 7-2'-thienylacetamidocephalosporanate with pyridine in an aqueous medium in the presence of an at least equimolar proportion, calculated on the 7-acylamidocephalosporanic acid, of thiocyanate ions and recovering the resultant crude N-(7-2'-thienylacetamidoceph - 3 - em-3-ylmethyl) pyridinium-4-carboxylate hydrothiocyanate;
  (B) converting the crude hydrothiocyanate from (A) to the betaine form by reacting said salt with a base, thiocyanate impurities being separated in an organic phase and the betaine being recovered in an aqueous phase;
  (C) passing the aqueous phase from (B) through at least one ion-exchanger to remove further impurities;
  (D) reacting the aqueous phase from (C) with nitric acid to form N-(7-2'-thienylacetamidoceph-3-em-3-ylmethyl) pyridinium-4-carboxylate hydronitrate;
  (E) separating the hydronitrate from (D) from the mother liquor and converting the hydronitrate to the betaine form by contacting with an organic base having a pKb of less than 6, a solution or suspension of said hydronitrate in an organic solvent selected from the group consisting of an N-alkyl substituted amide, an N,N-dialkylcyanamide, a tetraalkylurea, a dialkyl sulphoxide and said base when liquid and said hydronitrate is at least partially soluble therein, thereby forming a solution of the hydronitrate of said base in said solvent; and
  (F) recovering said betaine from the organic medium.

17. A process as defined in claim 16 wherein said base in Step (E) is triethylamine.

18. A process as claimed in claim 16 wherein said solvent in Step (E) has the formula:

$$R^3.CO.NR^4.R^5$$

where $R^3$ is selected from the group consisting of hydrogen and alkyl groups containing 1–5 carbon atoms and $R^4$ and $R^5$ are each alkyl groups containing 1–5 carbon atoms.

References Cited

UNITED STATES PATENTS 3,218,318   11/1965   Flynn.
3,280,118   10/1966   Eardley et al.

NICHOLAS S. RIZZO, Primary Examiner